(12) United States Patent
Shimamura (10) Patent No.: US 6,606,090 B2
(45) Date of Patent: Aug. 12, 2003

(54) THREE-DIMENSIONAL MODEL ANALYZING APPARATUS

(75) Inventor: Kouichi Shimamura, Nagano (JP)

(73) Assignee: Fujitsu Nagano Systems Engineering Limited, Nagano (JP)

( * ) Notice: Subject to any disclaimer, the term of this patent is extended or adjusted under 35 U.S.C. 154(b) by 308 days.

(21) Appl. No.: 09/790,636

(22) Filed: Feb. 23, 2001

(65) Prior Publication Data

US 2002/0000987 A1 Jan. 3, 2002

(30) Foreign Application Priority Data

Jun. 12, 2000 (JP) ...................................... 2000-174927

(51) Int. Cl.⁷ .............................................. G06T 15/00
(52) U.S. Cl. ...................................................... 345/419
(58) Field of Search ................................. 345/419, 420, 345/423, 619, 620, 649, 650, 656

(56) References Cited

U.S. PATENT DOCUMENTS 5,815,400 A * 9/1998 Hirai et al. ................. 700/173
6,091,825 A * 7/2000 Minkofski .................... 381/72
6,141,034 A * 10/2000 McCutchen .................. 348/36
6,187,032 B1 * 2/2001 Ohyu et al. .................. 600/409

* cited by examiner

*Primary Examiner*—Phu K. Nguyen (57) ABSTRACT

A three-dimensional model analyzing apparatus for optimally segmenting a three-dimensional model to be analyzed. Input unit inputs a three-dimensional model to be analyzed, and rotated model generating unit causes the three-dimensional model input from the input unit to rotate successively by a predetermined angle in a three-dimensional space, to generate a plurality of rotated models derived at different angles. Segmenting unit segments each of the rotated models into a plurality of polyhedrons having an identical shape, and comparing unit compares the surface area or volume of each rotated model segmented by the segmenting unit with the surface area or volume of the original three-dimensional model. Presenting unit presents an optimum rotated model in accordance with the results of comparison by the comparing unit.

7 Claims, 14 Drawing Sheets

THREE-DIMENSIONAL MODEL ANALYZING APPARATUS

BACKGROUND OF THE INVENTION

1. Field of the Invention

The present invention relates to a three-dimensional model analyzing apparatus, and more particularly, to a three-dimensional model analyzing apparatus for analyzing physical properties of a three-dimensional model.

2. Description of the Related Art

Finite element method is known as an approximation method used in structural mechanics, electrical field theory and fluid mechanics for studying continuous physical systems.

In the finite element method, a three-dimensional model to be analyzed is segmented into a plurality of small parts (finite elements) and functions of the individual elements are approximated to obtain a target algebraic equation.

Conventionally, an object of analysis is segmented into a plurality of elements by manual operation. In this case, generally a portion of the object of analysis where the shape abruptly changes is finely segmented because stress is liable to be concentrated in such portion, while a portion of the object where the shape continues to be the same for a certain length is roughly segmented.

The results of analysis can, however, vary depending on the manner of how the object was segmented, and accordingly, the method is associated with a problem that the results of analysis vary depending on the proficiency of the operator.

To solve the problem, a technique called VOXEL method has been proposed. In the VOXEL method, an object of analysis is segmented into a plurality of hexahedrons of identical shape, which are called VOXELs, for analytic purposes. Since the object of analysis is broken into elements of identical shape, the analysis can be made easy, and also since the elements have an identical shape, the segmentation of the object of analysis can be automatically implemented by software.

Even with the VOXEL method, the results of analysis can differ depending on the direction in which a three-dimensional model to be analyzed is segmented by means of VOXELs. Such difference in analytic accuracy is also dependent on the substance of analysis, and therefore, with conventional techniques it is difficult to estimate an optimum segmentation method.

SUMMARY OF THE INVENTION

The present invention was created in view of the above circumstances, and an object thereof is to provide a three-dimensional model analyzing apparatus whereby high-accuracy analysis results can be obtained by a finite element method, without regard to the proficiency of the operator.

To achieve the above object, there is provided a three-dimensional model analyzing apparatus for analyzing physical properties of a three-dimensional model. The three-dimensional model analyzing apparatus comprises input means for inputting a three-dimensional model to be analyzed, rotated model generating means for causing the three-dimensional model input from the input means to rotate successively by a predetermined angle in a three-dimensional space, to generate a plurality of rotated models derived at different angles, segmenting means for segmenting each of the rotated models into a plurality of polyhedrons having an identical shape, comparing means for comparing a surface area or volume of each of the rotated models segmented by the segmenting means with a surface area or volume of the original three-dimensional model, and presenting means for presenting an optimum one of the rotated models in accordance with results of comparison by the comparing means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention will be hereinafter described with reference to the drawings.

Figure 1:
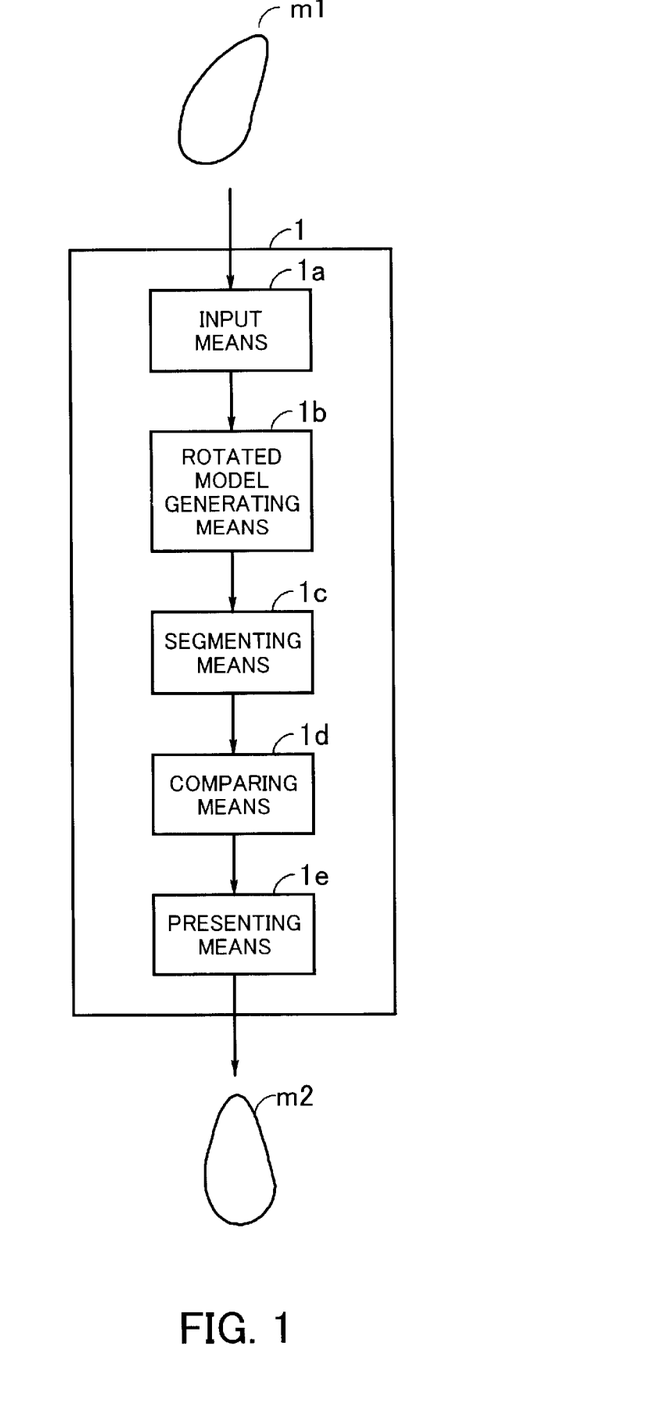
FIG. 1 is a diagram illustrating the principle of operation according to the present invention.

FIG. 1 illustrates the principle of operation of a three-dimensional model analyzing apparatus according to the present invention. As shown in the figure, the three-dimensional model analyzing apparatus 1 comprises input means 1a, rotated model generating means 1b, segmenting means 1c, comparing means 1d, and presenting means 1e.

The input means 1a is input with a three-dimensional model to be analyzed.

The rotated model generating means 1b causes the three-dimensional model input from the input means 1a to rotate successively by a predetermined angle in a three-dimensional space, to generate a plurality of rotated models derived at different angles.

The segmenting means 1c segments each of the rotated models into a plurality of polyhedrons having an identical shape.

The comparing means 1d compares the surface area or volume of each of the rotated models segmented by the segmenting means 1c with the surface area or volume of the original three-dimensional model.

The presenting means 1e presents an optimum one of the rotated models in accordance with the results of comparison by the comparing means 1d.

Operation according to the above principle will be now described.

Let it be assumed that the three-dimensional model analyzing apparatus 1 is input with a three-dimensional model m1 as an object of analysis. In this case, the input means 1a receives the input model and supplies the same to the rotated model generating means 1b.

Using a rotational axis optionally set with respect to the input three-dimensional model m1 as a reference axis, the rotated model generating means 1b successively rotates the model m1 by a predetermined angle at a time, to generate a plurality of rotated models. For example, using a Z axis of the three-dimensional model as the rotational axis, the rotated model generating means 1b rotates the model successively by a predetermined angle about the Z axis, and also rotates the model successively by a predetermined angle about an X axis, to derive a rotated model corresponding to the three-dimensional model at each angle. This operation makes it possible to generate a plurality of rotated models derived at different angles.

The segmenting means 1c segments (meshes) each of the rotated models generated by the rotated model generating means 1b into polyhedrons (e.g., cubes).

The comparing means 1d first obtains the volume and surface area of each rotated model segmented by the segmenting means 1c, and also obtains the volume and surface area of the original three-dimensional model. Then, if the analysis to be performed is an analysis of the surface of the three-dimensional model, the comparing means 1d compares the surface area of the three-dimensional model with that of each rotated model, and selects a rotated model of which the surface area is closest to that of the three-dimensional model.

On the other hand, if the analysis to be performed is an analysis of the whole of the three-dimensional model, the comparing means 1d compares the volume of the three-dimensional model with that of each rotated model, and selects a rotated model of which the volume is closest to that of the three-dimensional model.

In the case of analyzing the surface (e.g., surface stress) of the three-dimensional model, it is necessary that the surface approximation accuracy of a model obtained as a result of the polyhedral segmentation should be high, and accordingly, an optimum model is selected using the surface approximation accuracy as a criterion. On the other hand, in the case of analyzing the whole of the three-dimensional model (e.g., deformation of the model as a whole), the whole approximation accuracy of a model derived as a result of the polyhedral segmentation should be high, and therefore, an optimum model is selected using the whole approximation accuracy as a criterion, as stated above.

Consequently, according to the present invention, where the surface of the three-dimensional model is to be analyzed, a rotated model whose surface area is closest to that of the original three-dimensional model is selected from among the generated rotated models, and where the whole of the three-dimensional model is to be analyzed, a rotated model whose volume is closest to that of the original three-dimensional model is selected from among the generated rotated models.

The presenting means 1e presents to the user the rotated model that has been judged to be an optimum model by the comparing means 1d.

As described above, according to the present invention, a three-dimensional model as an object of analysis is rotated successively by a predetermined angle to generate rotated models, and each rotated model is segmented into polyhedrons oriented in the same direction. A rotated model whose surface area is closest to that of the original three-dimensional model is selected if the surface of the model is to be analyzed, and a rotated model whose volume is closest to that of the original three-dimensional model is selected if the whole of the model is to be analyzed, whereby high-accuracy analysis can be carried out.

An embodiment of the present invention will be now described.

Figure 2:
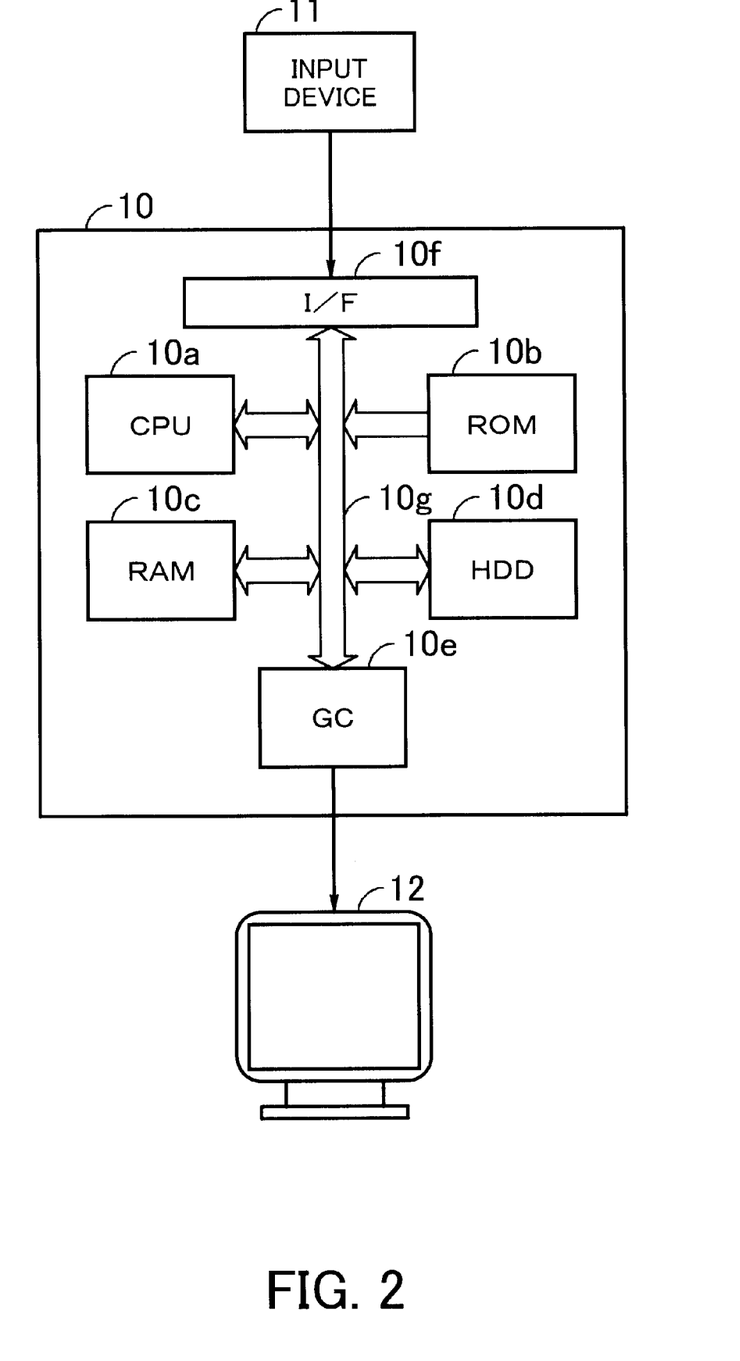
FIG. 2 is a diagram showing an exemplary configuration according to an embodiment of the present invention.

FIG. 2 is a block diagram showing an exemplary configuration according to the embodiment of the present invention. As shown in the figure, a three-dimensional model analyzing apparatus 10 comprises a CPU (Central Processing Unit) 10a, a ROM (Read Only Memory) 10b, a RAM (Random Access Memory) 10c, an HDD (Hard Disk Drive) 10d, a GC (Graphics Card) 10e, an I/F (Interface) 10f, and a bus 10g. The apparatus 10 analyzes a three-dimensional model input from an input device 11 etc., and outputs the result of analysis to a display device 12.

The CPU 10a performs various operations in accordance with application programs stored in the HDD 10d etc., and also controls the individual sections of the apparatus.

The ROM 10b stores basic programs executed by the CPU 10a, as well as data etc.

The RAM 10c temporarily stores programs being executed by the CPU 10a and data derived in the middle of operations.

The HDD 10d stores programs to be executed by the CPU 10a, as well as data including an object of analysis and results of analysis.

The GC 10e performs a drawing process in accordance with a draw command from the CPU 10a, converts an image obtained into video signal, and outputs the video signal.

The I/F 10f comprises a USB (Universal Serial Bus) or the like, for example, and converts the form of representation of data input from the input device 11 into a form conforming to the internal format of the three-dimensional model analyzing apparatus 10.

The bus 10g interconnects the CPU 10a, ROM 10b, RAM 10c, HDD 10d, GC 10e and I/F 10f, and permits data to be exchanged between these elements.

The input device 11 comprises, for example, a keyboard, a mouse, etc., and supplies the three-dimensional model analyzing apparatus 10 with information corresponding to the operator's manipulation.

The display device 12 comprises a CRT (Cathode Ray Tube) monitor, for example, and displays the results of analysis performed by the three-dimensional model analyzing apparatus 10.

Operation of the embodiment configured as above will be now described. The process described below is accomplished by reading out a predetermined program stored in the HDD 10d shown in FIG. 2 and executing the program by the CPU 10a.

Figure 3:
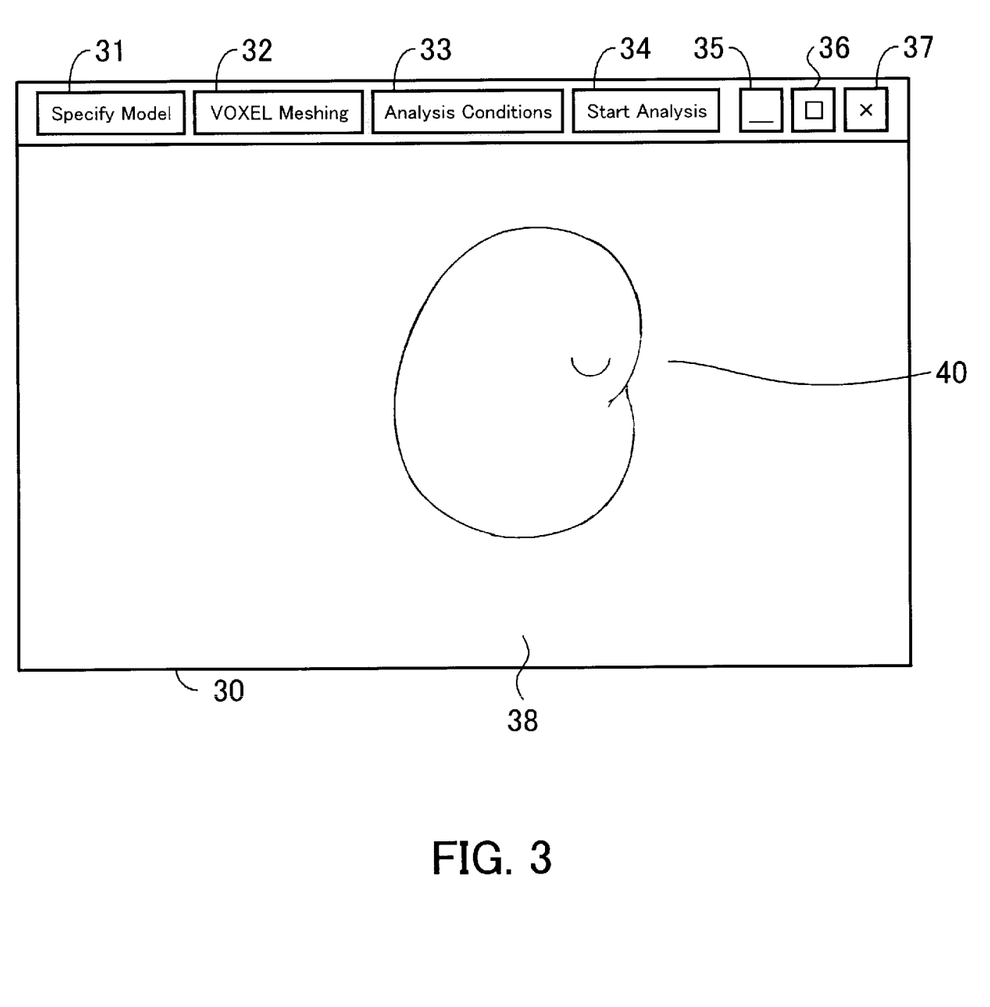
FIG. 3 shows an exemplary screen displayed on a display device when application software for performing analysis is started.

When application software for carrying out the analysis is started, a window 30 as shown in FIG. 3, for example, is displayed on the display device 12. In the illustrated example, a model constituted by curved faces has been selected as a three-dimensional model to be analyzed.

A Specify Model button 31 is operated to specify a model to be analyzed.

A VOXEL Meshing button 32 is operated to segment the three-dimensional model into VOXELs.

An Analysis Conditions button 33 is operated to set the conditions for analysis by finite element method.

A Start Analysis button 34 is operated to start analysis under the set conditions.

Buttons 35 to 37 are operated to minimize, maximize and close the window 30, respectively.

In a display area 38, a three-dimensional model to be analyzed is shown. In the illustrated example, a three-dimensional model 40 constituted by curved faces is displayed.

Figure 4:
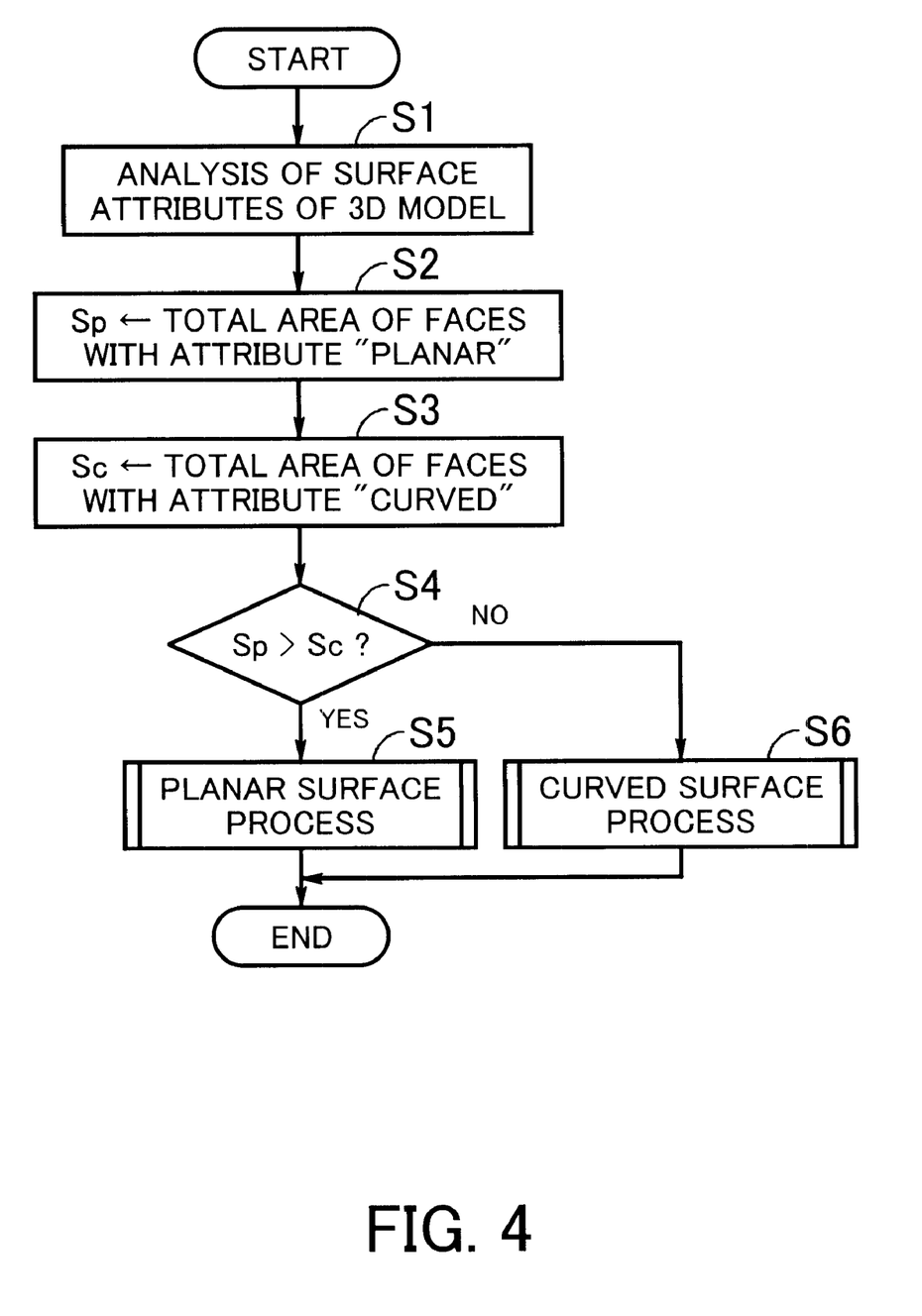
FIG. 4 is a flowchart showing an example of a process executed when a VOXEL Meshing button is operated in the screen shown in FIG. 3.

With the screen thus displayed, the VOXEL Meshing button 32 is operated, whereupon a process shown in FIG. 4 is started.

[S1] The CPU 10a analyzes the surface attributes of the three-dimensional model. Specifically, the CPU 10a analyzes the target three-dimensional model to determine whether individual surface regions or faces of the model are curved or planar.

[S2] The CPU 10a substitutes a total area of the faces with the attribute "planar" for a variable Sp.

[S3] The CPU 10a substitutes a total area of the faces with the attribute "curved" for a variable Sc.

[S4] The CPU 10a compares Sp with Sc. If Sp is greater than Sc, the flow proceeds to Step S5; if not, the flow proceeds to Step S6.

[S5] The CPU 10a executes a planar surface process which is a VOXEL meshing process for a three-dimensional model including a majority of planar faces. The process will be described in detail later with reference to FIG. 8.

[S6] The CPU 10a executes a curved surface process which is a VOXEL meshing process for a three-dimensional model including a majority of curved faces. Details of the process will be described later with reference to FIG. 13.

The above process makes it possible to execute the planar surface process if a three-dimensional model to be analyzed includes a majority of planar faces, and to execute the curved surface process if the model includes a majority of curved faces.

The planar surface process will be now described.

The planar surface process is a process for determining the angle at which a three-dimensional model including a majority of planar faces is to be segmented by VOXEL meshing. In the following, explanation will be first made of a specific example, and then the planar surface process according to the embodiment will be described in detail.

Figure 5:
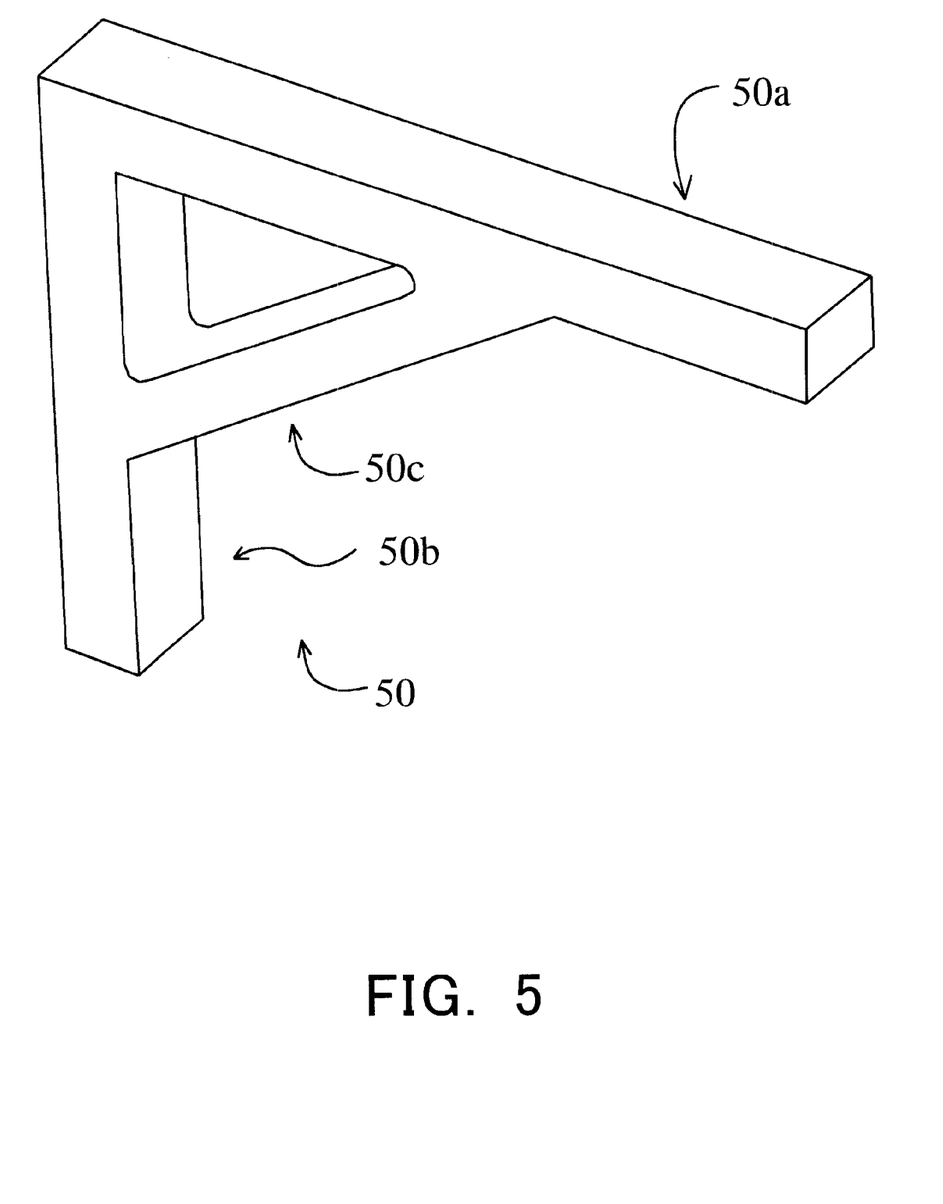
FIG. 5 is a diagram illustrating a planar surface process.

FIG. 5 shows an example of a three-dimensional model. The three-dimensional model 50 is constituted by a horizontal portion 50a, a vertical portion 50b, and a slant portion 50c. Let us consider how the three-dimensional model can be segmented into VOXELs.

Figure 6:
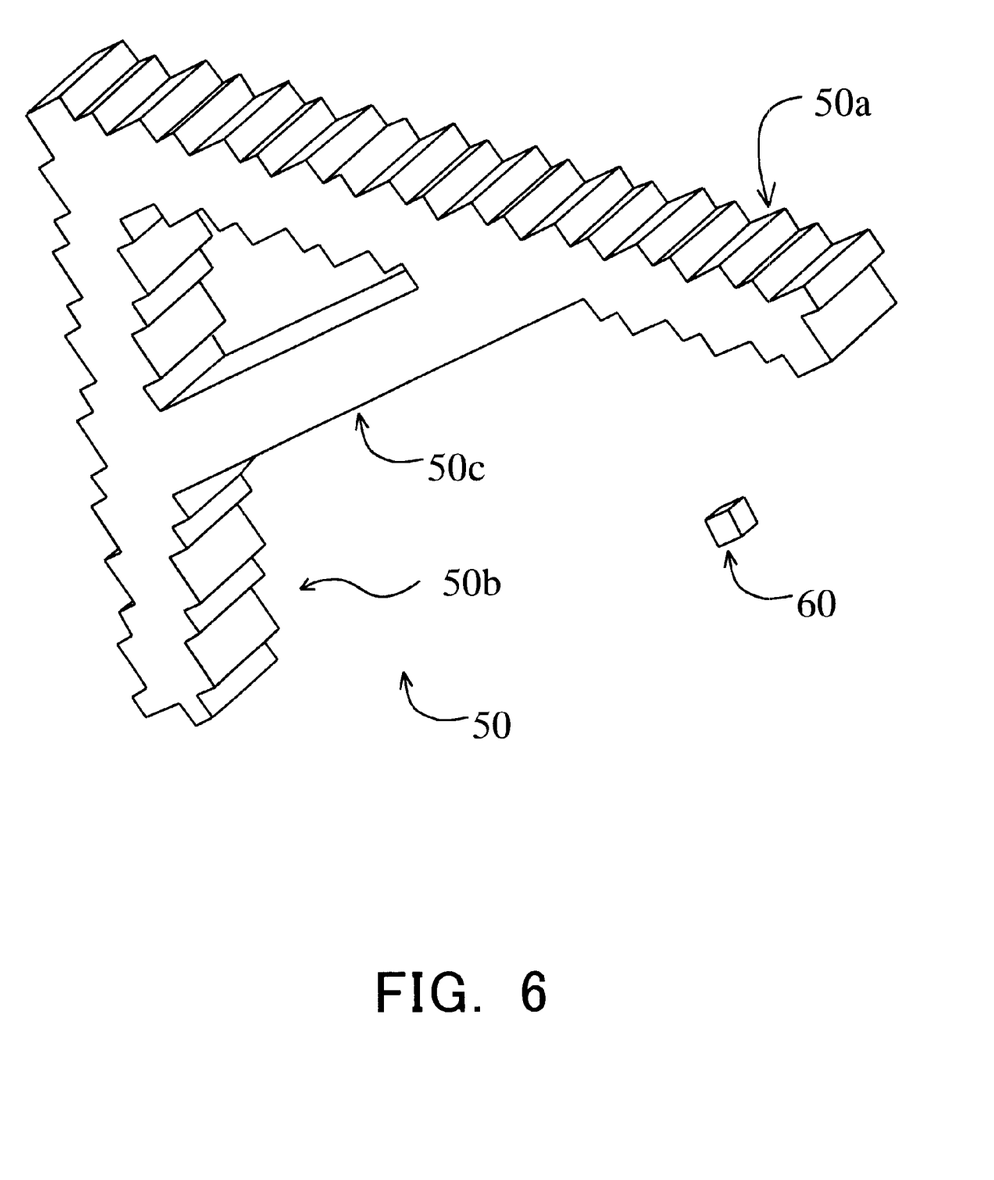
FIG. 6 is a diagram also illustrating the planar surface process.

FIG. 6 illustrates an example of segmentation wherein the three-dimensional model 50 is segmented into VOXELs 60 of which the direction has been determined based on the slant portion 50c.

Figure 7:
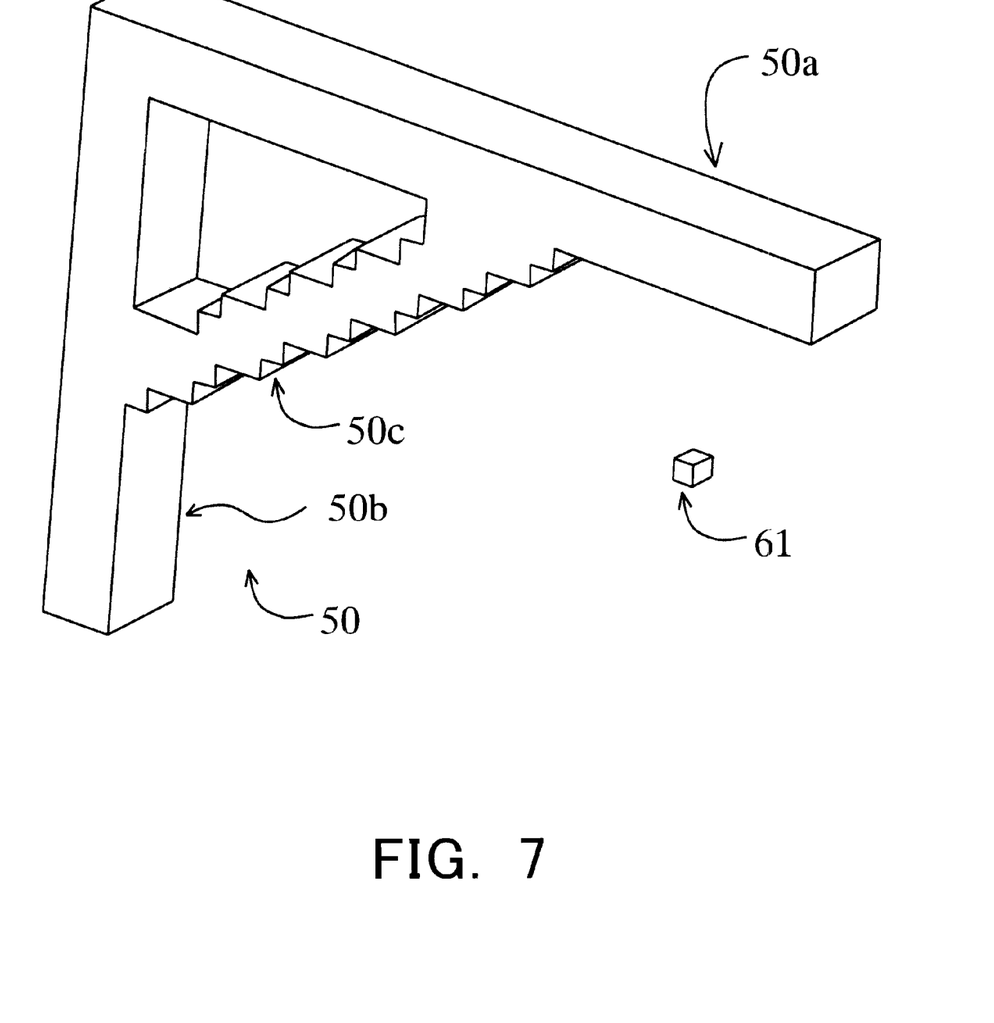
FIG. 7 is a diagram illustrating the planar surface process.

FIG. 7 illustrates another example of segmentation wherein the three-dimensional model 50 is segmented into VOXELs 61 whose direction has been determined based on the horizontal and vertical portions 50a and 50b.

As seen from these figures, the portion including faces which are neither parallel nor perpendicular to the reference portion is low in segmentation accuracy. In terms of accuracy, therefore, segmentation should desirably be carried out on the basis of a group of faces having a maximum area among the groups of faces parallel to or perpendicular to the reference portion.

Taking also the above into account, a VOXEL meshing method for a three-dimensional model including a majority of planar faces will be described.

Figure 8:
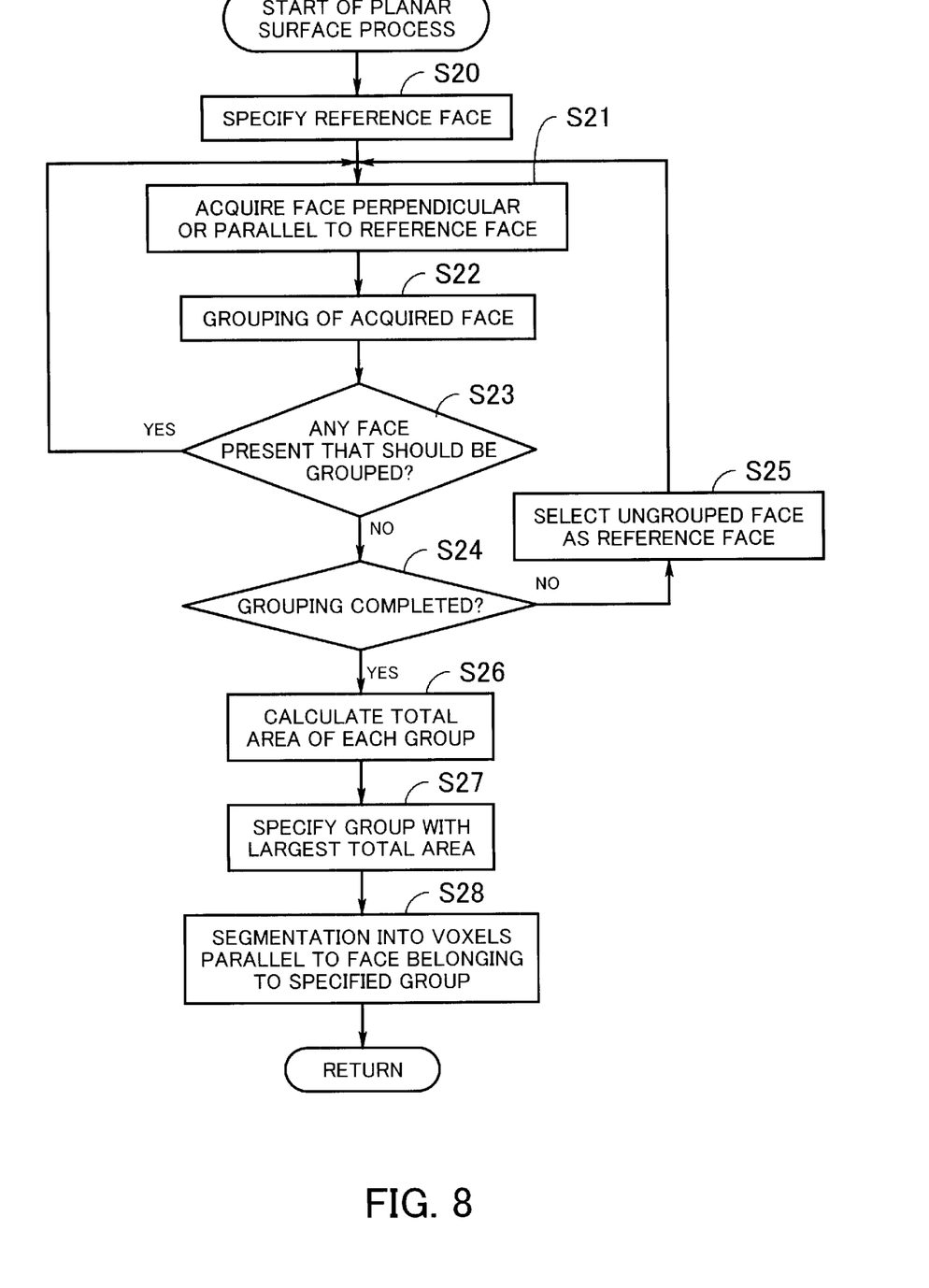
FIG. 8 is a flowchart showing an example of the planar surface process.

FIG. 8 is a flowchart illustrating an example of the VOXEL meshing method applied to a three-dimensional model including a majority of planar faces.

[S20] The CPU 10a specifies a reference face as an object of processing, among the faces of the three-dimensional model.

Figure 9:
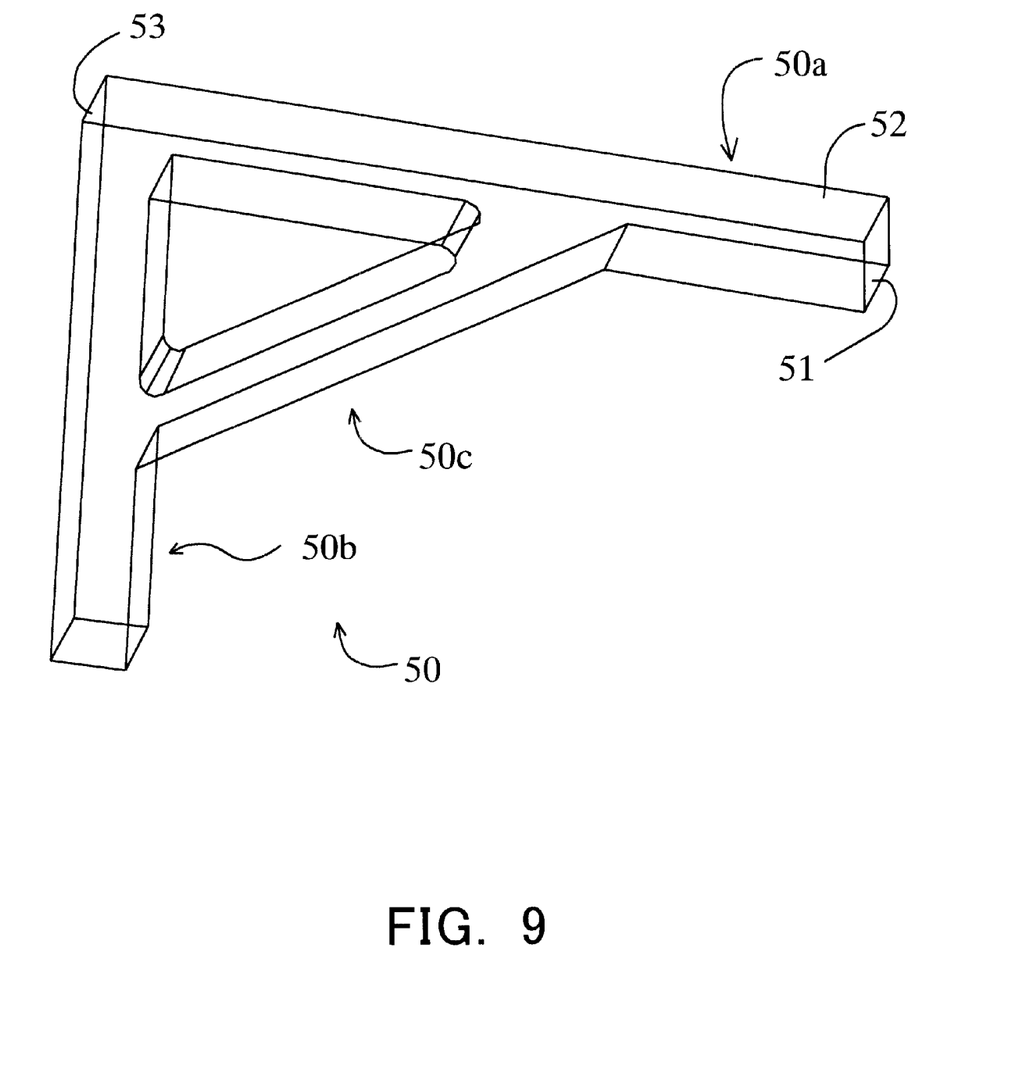
FIG. 9 is a diagram showing the relationship between a reference face and other faces.

In the example shown in FIG. 9, a face 51, for example, which is a bottom face of the horizontal portion 50a, is specified as the reference face. The results of analysis are the same no matter which face is set as the reference face at this stage.

[S21] The CPU 10a acquires a face perpendicular to or parallel to the reference face.

In the example of FIG. 9, a face 52 or other similar face is acquired as a face perpendicular to the reference face 51, and a face 53 or other similar face is acquired as a face parallel to the reference face.

[S22] The CPU 10a classifies the thus-acquired face into a group related to the specified reference face.

[S23] The CPU 10a determines whether or not there remains a face that should be grouped. If such a face exists, the flow returns to Step S21 to repeat the same process; if not, the flow proceeds to Step S24.

[S24] The CPU 10a determines whether or not the grouping has been completed. Specifically, it is determined whether or not the grouping of all faces has been completed. If the grouping has been completed, the flow proceeds to Step S26; if not, the flow proceeds to Step S25.

[S25] The CPU 10a selects an ungrouped face as the reference face.

In the example of FIG. 9, any one of the faces of the slant portion 50c is selected as a new reference face.

[S26] The CPU 10a calculates a total area of each of the groups.

[S27] The CPU 10a specifies a group whose total area is the largest.

In the example of FIG. 9, the group related to the reference face 51, that is, the group consisting of the faces of the horizontal and vertical portions 50a and 50b, is specified as the group with the largest total area.

[S28] The CPU 10a segments the three-dimensional model into VOXELs having faces parallel to a certain face belonging to the specified group.

According to the above process, the three-dimensional model shown in FIG. 5 is segmented by means of the VOXELs 61 oriented as shown in FIG. 7.

The curved surface process appearing in FIG. 4 will be now described. In the following, a VOXEL meshing process for a three-dimensional model including a majority of curved faces will be first outlined with reference to FIGS. 10 to 12, and then a specific procedure will be described with reference to FIG. 14.

Figure 10:
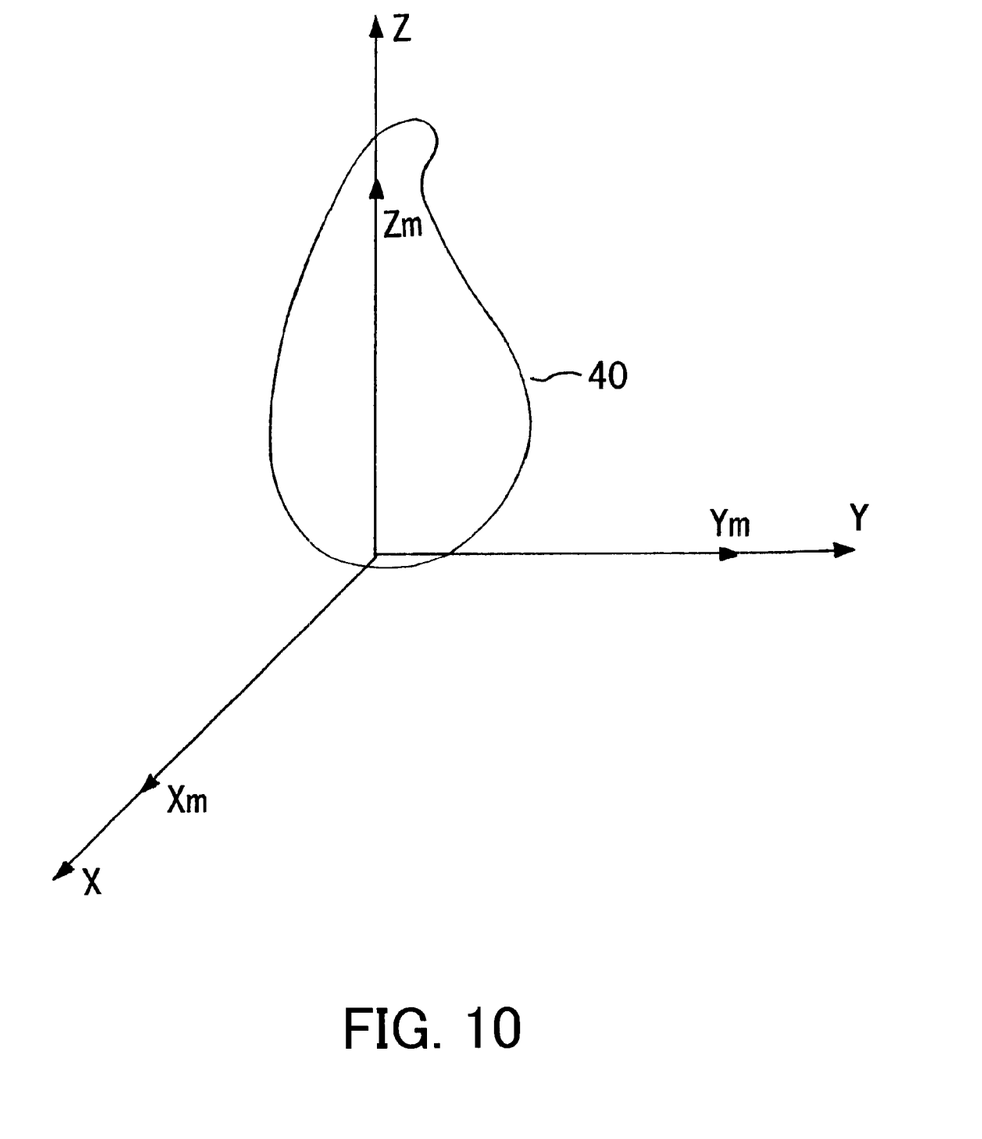
FIG. 10 is a diagram illustrating a curved surface process.

FIG. 10 shows an example of a three-dimensional model including a majority of curved faces. In the illustrated example, a coordinate system (Xm, Ym, Zm) for the three-dimensional model 40 is established such that it coincides with a coordinate system (X, Y, Z) of the apparatus.

In this embodiment, VOXEL meshing is carried out with the angle of the three-dimensional model successively changed, and the surface area or volume of a segmented model derived at each angle is compared with the surface area or volume of the original three-dimensional model, to determine an optimum segmented model.

To change the angle of the three-dimensional model, two axes are selected and the model is rotated about both of the axes by a predetermined angle at a time.

Figure 11:
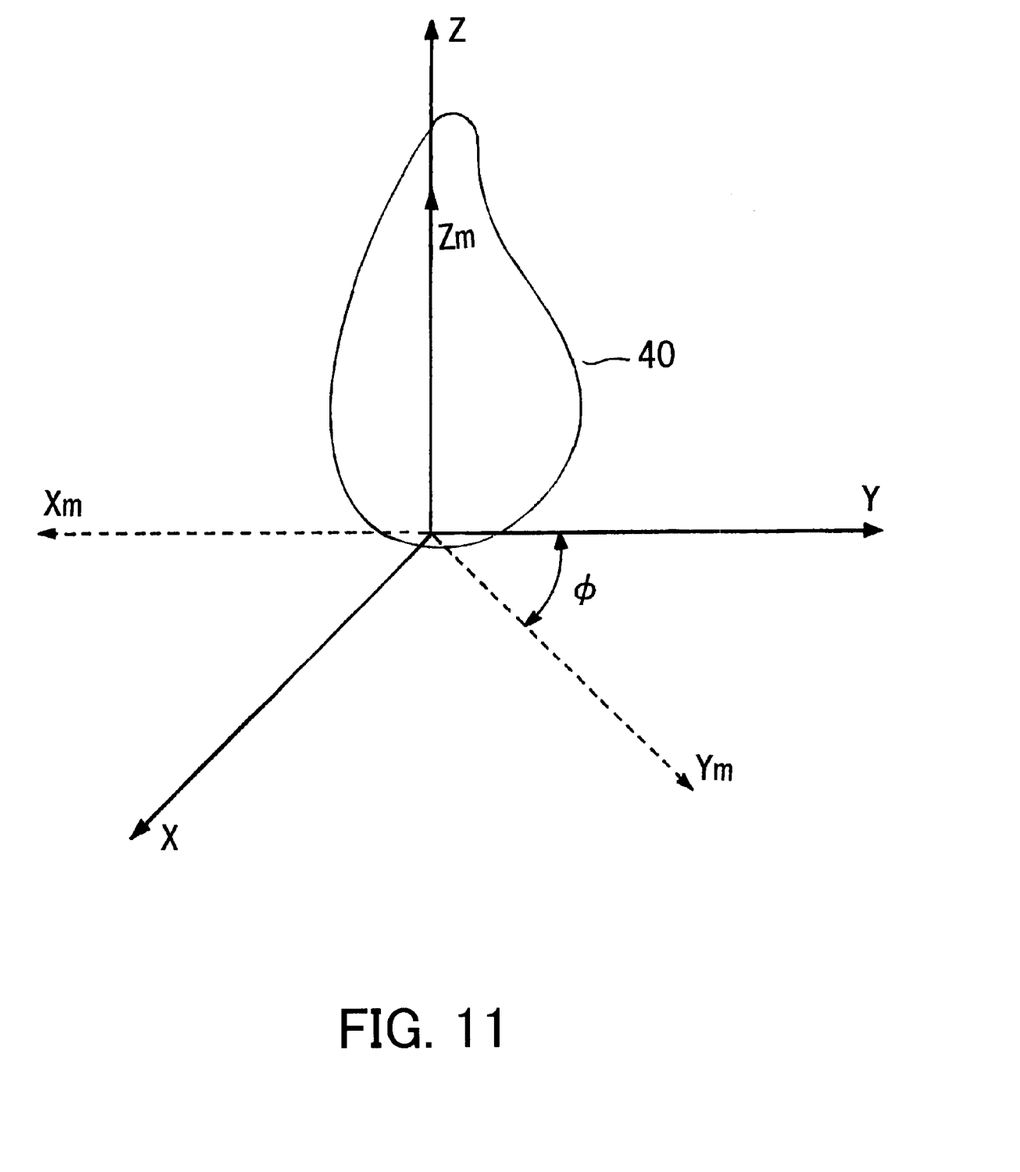
FIG. 11 is a diagram also illustrating the curved surface process.
Figure 12:
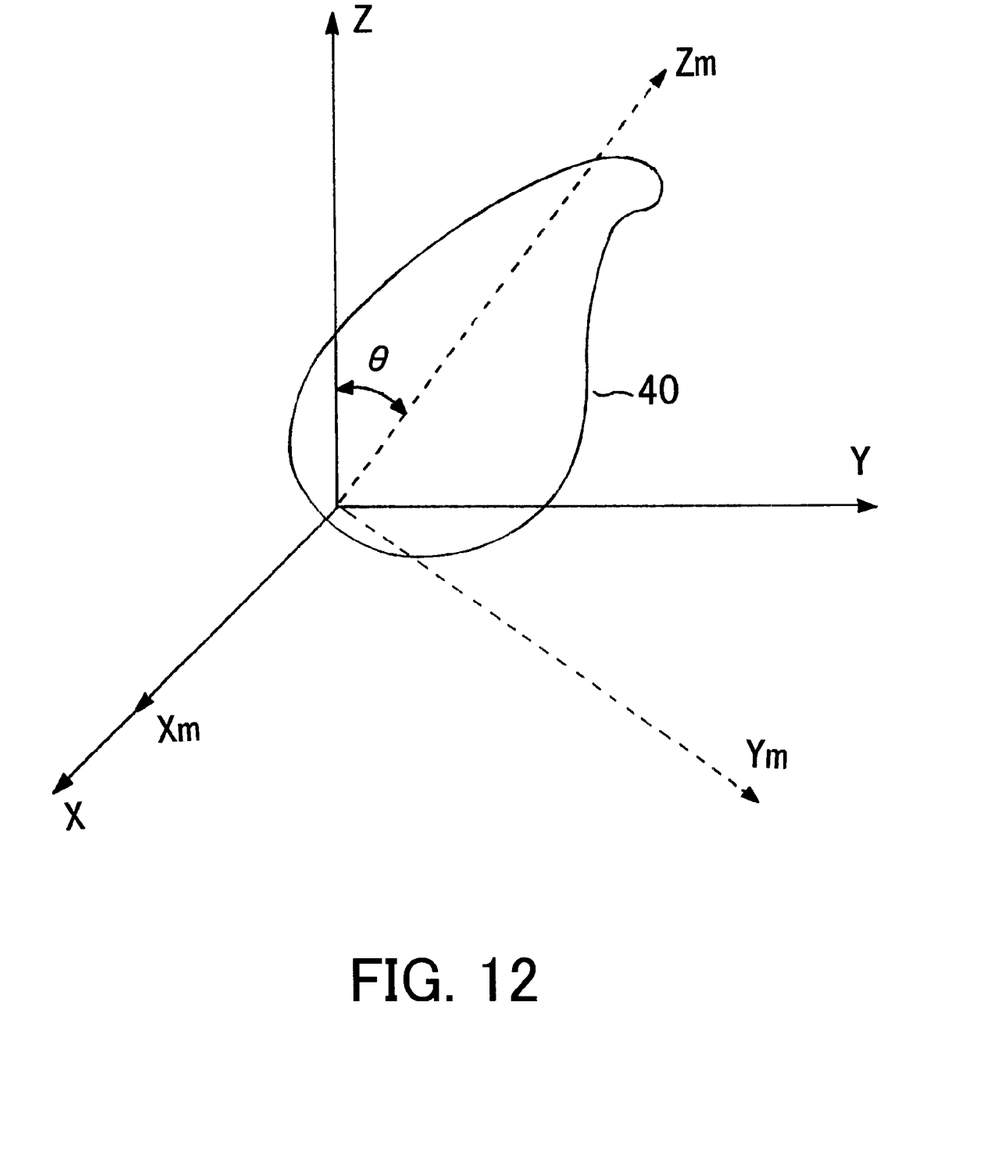
FIG. 12 is a diagram illustrating the curved surface process.

For example, let it be assumed that the three-dimensional model 40 is rotated about the Z axis up to a maximum angle φ, as shown in FIG. 11, and is also rotated about the X axis up to a maximum angle of θ, as shown in FIG. 12. To rotate the three-dimensional model about the two axes, the model is rotated about the Z axis from the angle "0" to the angle φ by dφ at a time and simultaneously rotated about the X axis by dθ at a time, for example. This process provides a plurality of rotated models. In practice such process can be accomplished by a double loop process involving θ and φ. Both of θ and φ are set to about 40 degrees, for example.

Subsequently, the rotated models thus obtained are each segmented into VOXELs oriented in the same direction, thereby generating a plurality of segmented models. Then, in the case of analyzing the surface of the three-dimensional model, a rotated model with a surface area of which the ratio to the surface area of the original three-dimensional model is closest to "1" is selected as an optimum model.

On the other hand, in the case of analyzing the whole of the three-dimensional model, a rotated model with a volume of which the ratio to the volume of the original three-dimensional model is closest to "1" is selected as an optimum model.

Figure 13:
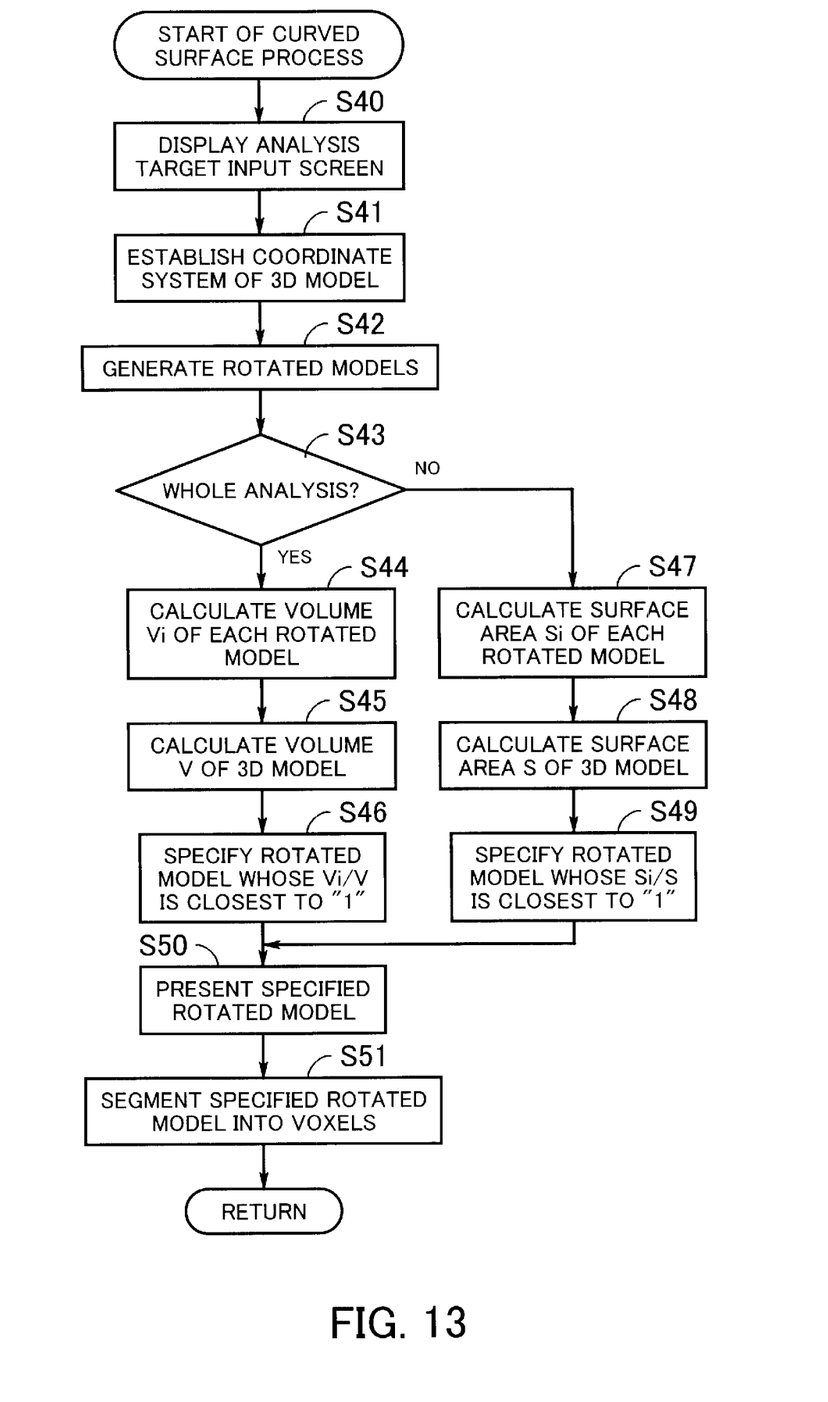
FIG. 13 is a flowchart showing an example of the curved surface process.

A specific procedure will be now described. FIG. 13 is a flowchart showing an example of the aforementioned curved surface process (process executed in Step S6 appearing in FIG. 4). Upon start of the process shown in the flowchart, the following steps are executed.

Figure 14:
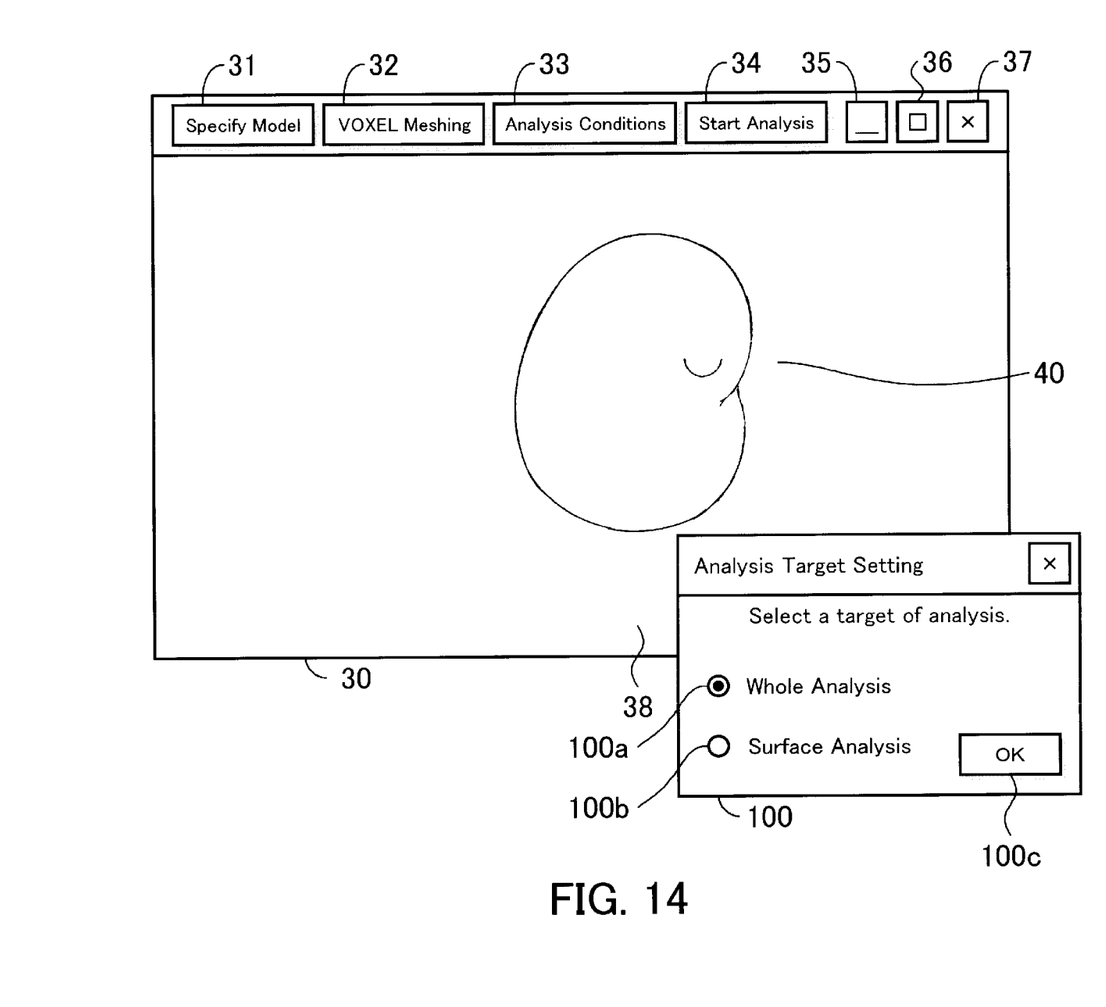
FIG. 14 shows an exemplary screen displayed on the display device upon execution of the process shown in FIG. 13.

[S40] The CPU 10a causes the display device 12 shown in FIG. 2 to display an analysis target input screen shown in FIG. 14 so that a target of analysis may be input.

In the example illustrated in FIG. 14, a window 100 entitled "Analysis Target Setting" is displayed on the lower right part of the window 30. Two selection items "Whole Analysis" and "Surface Analysis" are displayed in the displayed area of the window 100, and radio buttons are shown to the left of the respective items. Also, an OK button 100c is shown in the lower right part of the window 100 and is operated to confirm the setting made.

In the window 100, either of the items is selected and the OK button 100c is operated, whereupon Step S41 is executed.

[S41] The CPU 10a establishes a coordinate system for the three-dimensional model. For example, a coordinate system identical with that of the apparatus, as shown in FIG. 10, is established as the coordinate system for the three-dimensional model.

[S42] The CPU 10a causes the coordinate system of the three-dimensional model to rotate successively by a predetermined angle, thereby generating rotated models.

For example, as shown in FIGS. 11 and 12, the model is rotated from the angle "0" to the angle φ about the Z axis successively by the angle dφ, and at the same time is rotated from the angle "0" to the angle θ about the X axis successively by dθ, to obtain rotated models of the three-dimensional model at the individual angles.

[S43] The CPU 10a determines whether or not "Whole Analysis" has been selected in the window 100 shown in FIG. 14. If "Whole Analysis" has been selected, the flow proceeds to Step S44; if not, the flow proceeds to Step S47.

[S44] The CPU 10a calculates the volume Vi of each rotated model.

[S45] The CPU 10a calculates the volume V of the three-dimensional model.

[S46] The CPU 10a specifies a rotated model with a volume of which the ratio to the volume of the three-dimensional model, Vi/V, is closest to "1".

[S47] The CPU 10a calculates the surface area Si of each rotated model.

[S48] The CPU 10a calculates the surface area S of the three-dimensional model.

[S49] The CPU 10a specifies a rotated model with a surface area of which the ratio to the surface area of the three-dimensional model, Si/S, is closest to "1".

[S50] The CPU 10a displays the specified rotated model on the display device 12, thereby presenting the model to the user.

[S51] The CPU 10a performs a process of segmenting the specified rotated model into VOXELs.

The above process makes it possible to subject three-dimensional models including curved faces to VOXEL meshing by an optimum method.

As described above, according to the embodiment of the present invention, in cases where a three-dimensional model to be analyzed includes a majority of planar faces, the model is subjected to VOXEL meshing based on a group of faces having the largest total area among groups consisting of faces parallel or perpendicular to each other. On the other hand, where the three-dimensional model includes a majority of curved faces, the model is rotated successively by a predetermined angle to generate rotated models, a rotated model with a volume closest to that of the original three-dimensional model is selected if the whole of the model is to be analyzed, and a rotated model with a surface area closest to that of the original three-dimensional model is selected if the surface of the model is to be analyzed, followed by VOXEL meshing of the selected model. Accordingly, any input figure can be subjected to VOXEL meshing by an optimum method.

In the foregoing embodiment, where the model to be analyzed includes a majority of curved faces, analysis is performed differently depending on whether whole analysis or surface analysis has been selected. Instead of such selection, the procedure stated below may alternatively be employed to uniquely specify an optimum rotated model.

Provided that the volume and surface area of each rotated model are Vi and Si, respectively, and that the volume and surface area of the three-dimensional model are V and S, respectively, an evaluation value Ei of each rotated model is obtained according to the equation below. In the equation, SQR( ) is a function for deriving the square root of the parenthesized number.

$$Ei = SQR((1-Vi/V)^2 + (1-Si/S)^2) \qquad (1)$$

Then, a rotated model whose Ei value is closest to "0" is selected as the optimum rotated model.

This procedure also makes it possible to specify the optimum rotated model.

In the foregoing embodiment, the process shown in FIG. 13 is performed with respect only to three-dimensional models including a majority of curved faces, but the process can of course be performed with respect to three-dimensional models including a majority of planar faces.

Also, in the above embodiment, the process shown in FIG. 8 or the one shown in FIG. 13 is selected in accordance with the total areas of the planar faces and curved faces of the three-dimensional model. Alternatively, both of the processes shown in FIGS. 8 and 13 may be performed and the results of the analyses may be synthesized to select an optimum meshing method.

The functions of the above-described processing can be performed by a computer. In this case, the contents of the processing functions to be accomplished by the three-dimensional model analyzing apparatus are described in a program and recorded in a computer-readable recording medium so that by executing the program by a computer, the above-described processing can be performed. The computer-readable recording medium includes magnetic recording device, semiconductor memory and the like. To distribute the program to the market, the program may be stored in portable recording media such as CD-ROM (Compact Disk Read Only Memory) or floppy disk. Alternatively, the program may be stored in a storage device of a computer connected to a network and may be transferred to other computers through the network. To execute the program by a computer, the program stored in a hard disk unit or the like of the computer is loaded into the main memory and executed.

As described above, according to the present invention, a three-dimensional model analyzing apparatus for analyzing physical properties of a three-dimensional model comprises input means for inputting a three-dimensional model to be analyzed, rotated model generating means for causing the three-dimensional model input from the input means to rotate successively by a predetermined angle in a three-dimensional space, to generate a plurality of rotated models derived at different angles, segmenting means for segmenting each of the rotated models into a plurality of polyhedrons having an identical shape, comparing means for comparing a surface area or volume of each of the rotated models segmented by the segmenting means with a surface area or volume of the original three-dimensional model, and presenting means for presenting an optimum one of the rotated models in accordance with results of comparison by the comparing means, whereby the three-dimensional model can be segmented optimally.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A three-dimensional model analyzing apparatus for analyzing physical properties of a three-dimensional model, comprising:

input means for inputting a three-dimensional model to be analyzed;

rotated model generating means for causing the three-dimensional model input from said input means to rotate successively by a predetermined angle in a three-dimensional space, to generate a plurality of rotated models derived at different angles;

segmenting means for segmenting each of the rotated models into a plurality of polyhedrons having an identical shape;

comparing means for comparing a surface area or volume of each of the rotated models segmented by said segmenting means with a surface area or volume of the original three-dimensional model; and presenting means for presenting an optimum one of the rotated models in accordance with results of comparison by said comparing means.

2. The three-dimensional model analyzing apparatus according to claim 1, wherein when whole of the three-dimensional model is to be analyzed, said comparing means compares the volume of each of the rotated models with that of the three-dimensional model.

3. The three-dimensional model analyzing apparatus according to claim 1, wherein when surface of the three-dimensional model is to be analyzed, said comparing means compares the surface area of each of the rotated models with that of the three-dimensional model.

4. The three-dimensional model analyzing apparatus according to claim 1, wherein said comparing means compares both the surface area and volume of each of the rotated models with those of the three-dimensional model, and said presenting means selects an optimum one of the rotated models in accordance with results of comparisons between the surface areas and between the volumes, and presents the optimum rotated model.

5. The three-dimensional model analyzing apparatus according to claim 1, wherein said comparing means compares the rotated models with each other as to ratio of the volume and the surface area.

6. The three-dimensional model analyzing apparatus according to claim 1, further comprising surface shape analyzing means for analyzing surface shape of the three-dimensional model to determine which of planar faces and curved faces are a majority of faces constituting the surface shape, if it is judged by said surface shape analyzing means that the surface shape includes a majority of planar faces, said presenting means specifies a set of faces which consists of faces parallel or perpendicular to each other and whose total surface area is largest, and suggests segmenting the model into polyhedrons with a face parallel or perpendicular to any of the set of faces, and if it is judged by said surface shape analyzing means that the surface shape includes a majority of curved faces, said presenting means presents an optimum rotated model in accordance with the results of comparison by said comparing means.

7. A computer-readable recording medium for causing a computer to perform a process of analyzing physical properties of a three-dimensional model, wherein the computer is caused to function as input means for inputting a three-dimensional model to be analyzed, rotated model generating means for causing the three-dimensional model input from the input means to rotate successively by a predetermined angle in a three-dimensional space, to generate a plurality of rotated models derived at different angles, segmenting means for segmenting each of the rotated models into a plurality of polyhedrons having an identical shape, comparing means for comparing a surface area or volume of each of the rotated models segmented by the segmenting means with a surface area or volume of the original three-dimensional model, and presenting means for presenting an optimum one of the rotated models in accordance with results of comparison by the comparing means.

* * * * *